UNITED STATES PATENT OFFICE.

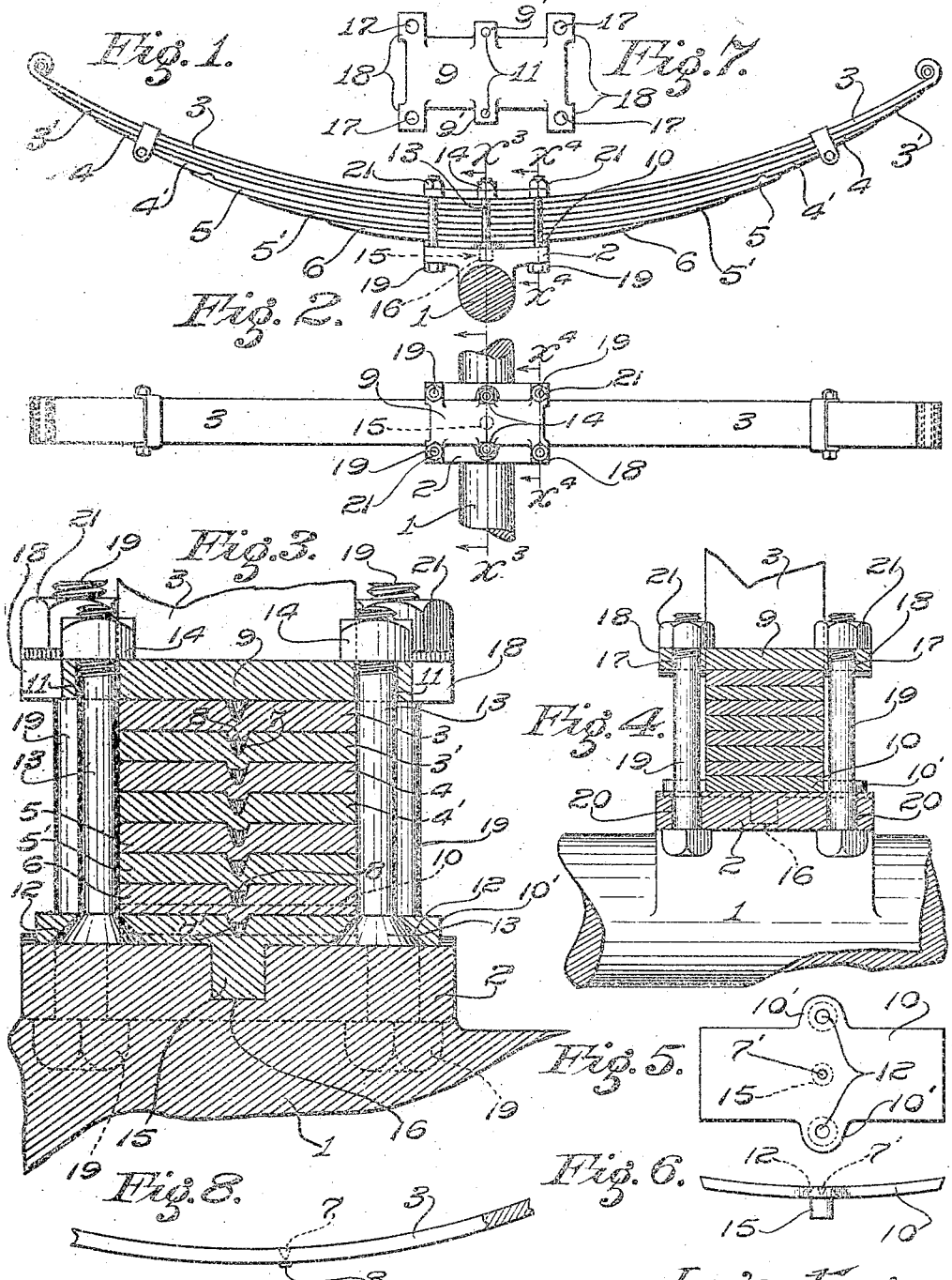

JOSEPH HERBERT ATHONS, OF LOS ANGELES, CALIFORNIA, ASSIGNOR TO JOSEPH LAWRENCE PIKE, OF LOS ANGELES, CALIFORNIA.

VEHICLE-SPRING.

No. 863,565.    Specification of Letters Patent.    Patented Aug. 13, 1907.

Application filed February 20, 1907. Serial No. 358,516.

*To all whom it may concern:*

Be it known that I, JOSEPH HERBERT ATHONS, a citizen of the United States, residing at Los Angeles, in the county of Los Angeles and State of California, have invented new and useful Improvements in Vehicle-Springs, of which the following is a specification.

The object of the invention is to provide a vehicle spring of superior strength with a given weight of material; to minimize liability of breakage of automobile springs and the like: also to provide means for retaining the spring in place on the vehicle axle.

In order that my invention may be fully understood, I will refer to the construction of springs known to me to be in common use for automobiles, and which are subject to breakage from a cause which it is the object of my invention to avoid; that is to say, in constructing and mounting a half elliptical spring, or both halves of a full elliptical spring, it has heretofore been customary to bore a hole through each of the leaves of such spring at some point along its mid-length, and the several leaves of the spring thus perforated are fastened together by a bolt and nut, and thereupon the spring thus formed will be mounted on the spring-seat, chair, or saddle of the axle, and will be fastened thereon by clips. Under hard usage, springs of this kind very frequently break, the fracture occurring at the part of the spring weakened by the hole before referred to.

An object of my invention is to provide a construction which avoids the weakening of the spring in the manner described, and which will give increased strength to the spring by cheap, simple and efficient means.

The principle of this invention is that the spring is so constructed as to avoid the usual perforation, and to prevent the vibrations of the opposite limbs of the spring from concentrating at the middle of the fixed portion of the spring.

The accompanying drawings illustrate the invention:—

Figure 1 is a side elevation of a half elliptical spring embodying the invention as mounted on an axle, a portion of which is shown in cross-section. Fig. 2 is a plan view of the spring shown in Fig. 1. Fig. 3 is an enlarged vertical mid-section on line $x^3$, Figs. 1 and 2, showing the means for holding the spring together. Fig. 4 is an enlarged vertical section on line $x^4$, Figs. 1 and 2, showing the means for fastening the spring upon the axle. Fig. 5 is a plan of the bottom clamp plate. Fig. 6 is an elevation of the bottom clamp plate. Fig. 7 is a plan of the upper clamp plate detached. Fig. 8 is a fragmental elevation of one of the leaves, showing the central dent, with the corresponding boss.

1 is a vehicle axle provided with the usual spring-3, 3', 4, 4', 5, 5', 6 designate the leaves of the spring, the same being of the usual form excepting that instead of being pierced with holes as in the construction referred to, they are respectively provided at a point on the axial mid-line, with a dent 7 and a boss 8; the dent being on one side of the leaf and the boss on the other side of the leaf directly opposite; the boss on one side being produced from metal forced outward from the surface of the leaf by the pressure of the tool which makes the corresponding dent in said leaf: that is to say,—the leaves of the spring are constructed after the manner of the leaves of locomotive springs in this one respect.

9 and 10 respectively designate two plates, each being provided at the middle at opposite edges, with two holes as 11, 12, to receive bolts 13 secured by nuts 14, whereby the normally bent leaves of the spring may be tightly held together with the boss of one leaf in the dent of the next leaf, and so on. Thus the leaves are positively prevented from sliding endwise on each other, and the middle of the spring is braced. The bolt holes 12 in the bottom clamp plate 10 are countersunk on the under side, which is provided with the boss 10', and the heads of the bolts 13 fit said countersunk holes and are flush with the underside of said plate, so that the plate will fit snugly against the spring seat 2.

By the construction above described the leaves of the spring may be clamped firmly together, the plates 9 and 10 serving as braces on opposite sides of the spring to strengthen the same at the point of contact with the spring-seat of the axle or vehicle body, as the case may be. One of said plates is designed to engage the spring-seat 2, and said plate and spring-seat are provided with engaging means, as a boss and an indentation, in a manner corresponding to those of the leaves of the spring and said plate is made complementary to the leaf of the spring with which it engages; that is to say, if said spring leaf is provided with an indentation on the face that engages the plate, said plate will be provided with a boss, and vice versa. In the drawing, the spring-leaf is shown as provided with a boss 8 engaging in an indentation 7' in the plate. Said plate is also provided on the side opposite that which engages the leaf, with a stud 15 engaging in a hole 16 in the axle or spring-seat 2. The top plate 9 is also provided with a plurality of bolt-holes 17 through portions 18 of said plate projecting beyond the edges of the spring leaves to accommodate bolts 19 which pass through bolt-holes 20 in the spring-seat, and are fastened by nuts 21 on said portions 18 of the top plate 9. By this construction the clamp plates 9 and 10 serve not only to hold the spring leaves pressed together and under tension, but also to hold the bolts that hold the spring in place on its seat.

In actual use, the vibration of the spring is practically excluded from the parts thereof clamped between the clamp plates, so that the strains are divided between the limbs of the spring on opposite sides of the spring-seat. This greatly reduces the liability of breakage, and at the same time the fastening means may be easily unfastened and applied for the purposes of repair.

I claim:—

The combination with an axle, of a spring seat thereon provided with a hole, a plate provided with a stud engaging in the hole, and also provided with countersunk bolt holes, the countersink being on the same side of the plate with said stud, said plate being also provided opposite the stud with an indentation, superposed spring leaves on said plate provided respectively with interlocking indentations and bosses, the lower leaf being provided with a boss to engage the indentation of said plate, a plate on top of said leaves, the same being provided with bolt holes, bolts in said countersunk bolt holes and in the holes of the upper plate, nuts on said bolts, said bolts engaging the edges of the spring leaves, bolts through the top plate and spring seat, and nuts on said bolts.

In testimony whereof, I have hereunto set my hand at Los Angeles California this 14th day of February 1907.

JOSEPH HERBERT ATHONS.

In presence of—
 JAMES R. TOWNSEND,
 JOSEPH LAWRENCE PIKE.